(12) United States Patent
Kaya et al.

(10) Patent No.: US 12,539,063 B2
(45) Date of Patent: Feb. 3, 2026

(54) PULSE OXIMETER THAT IS NOT AFFECTED FROM MOTION

(71) Applicant: Istanbul Medipol Universitesi, Istanbul (TR)

(72) Inventors: Berkay Kaya, Istanbul (TR); Sena Özdemir Görgü, Istanbul (TR); Zeliha Candan Algün, Istanbul (TR)

(*) Notice: Subject to any disclaimer, the term of this patent is extended or adjusted under 35 U.S.C. 154(b) by 675 days.

(21) Appl. No.: 17/785,238

(22) PCT Filed: Dec. 2, 2020

(86) PCT No.: PCT/TR2020/051209
§ 371 (c)(1),
(2) Date: Jun. 14, 2022

(87) PCT Pub. No.: WO2021/126117
PCT Pub. Date: Jun. 24, 2021

(65) Prior Publication Data
US 2022/0369967 A1      Nov. 24, 2022

(30) Foreign Application Priority Data
Dec. 18, 2019   (TR) ................................. 2019/20612

(51) Int. Cl.
*A61B 5/1455*    (2006.01)
*A61B 90/00*     (2016.01)

(52) U.S. Cl.
CPC .... *A61B 5/14552* (2013.01); *A61B 2090/064* (2016.02)

(58) Field of Classification Search
CPC ...................... A61B 5/14552; A61B 2090/064
See application file for complete search history.

(56) References Cited

U.S. PATENT DOCUMENTS

| 5,490,523 A | * | 2/1996 | Isaacson | A61B 5/6826 600/323 |
|---|---|---|---|---|
| 2007/0060808 A1 | | 3/2007 | Hoarau | |
| 2007/0078316 A1 | | 4/2007 | Hoarau et al. | |
| 2014/0031653 A1 | | 1/2014 | Baker, Jr. | |
| 2014/0361147 A1 | * | 12/2014 | Fei | G01J 1/0407 250/206 |

OTHER PUBLICATIONS

International Search Report for corresponding PCT/TR2020/051209, dated Mar. 22, 2021.
Written Opinion of the International Searching Authority for corresponding PCT/TR2020/051209, dated Mar. 22, 2021.

* cited by examiner

*Primary Examiner* — Abid A Mustansir
(74) *Attorney, Agent, or Firm* — EGBERT, MCDANIEL & SWARTZ, PLLC

(57) ABSTRACT

A pulse oximeter that is not affected by motion, which is formed of a small disk, a precision spring, a string, a sensor, a motor, a large disk, a rod and a string holder, wherein the oximeter enables continuous tracking of the oxygen saturation of a patient and correct measurement thereof.

2 Claims, 4 Drawing Sheets

PULSE OXIMETER THAT IS NOT AFFECTED FROM MOTION

TECHNICAL FIELD

Figure 1:
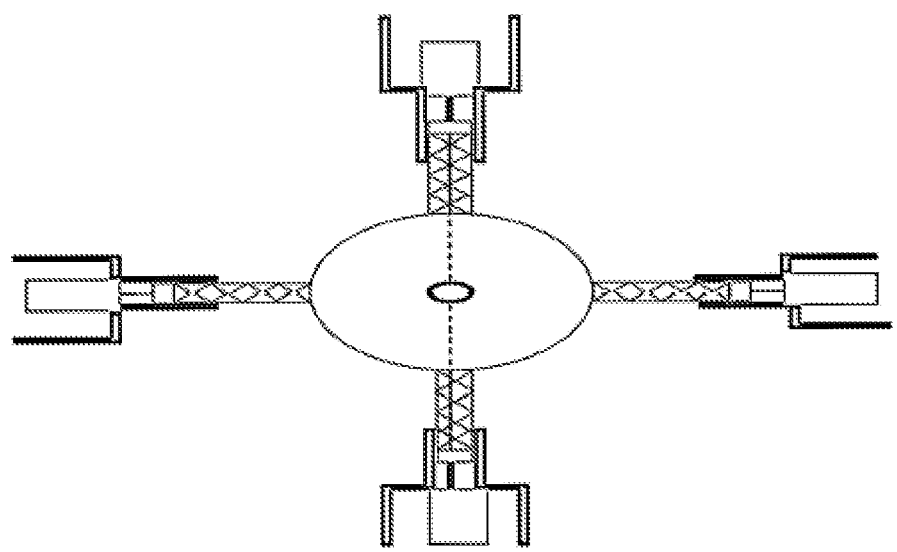

The invention is related to a pulse oximeter that is not affected from motion and provides correct information of the patient during pulmonary and cardiac rehabilitation, chest diseases, during CPET tests, and rehabilitation of athletes.

PRIOR ART

The pulse oximeter is a device which easily and rapidly measures and records the oxygen levels in blood and the heart rate per minute. The pulse oximeter provides continuous and instantaneous arterial hemoglobin saturation. Oxygen saturation is the amount of $O_2$ that binds to the blood in a vessel. This oxygen rate in the blood plays an important role in medical diagnosis. Therefore this data needs to be easily and precisely obtained.

Currently there are two general methods of obtaining this oxygen rate in blood. The first one is the classic blood sample drawing method that is difficult, painful and does not provide the clearest result. This method is based on drawing blood by inserting a needle into the correct vessel and into the correct place. The second method is to use an oximeter. Pulse oximeters are characterized by being generally used in displaying the oxygen values and pulse during anaesthesia. Oximeters are frequently used when the patient is recovering. The oxygen saturation values in patients that have been subjected to intensive care for prolonged periods, patients with respiratory problems, or those that have congenital cardiac diseases are lower and these values basically reflect the intensity of the diseases in these patients.

In the prior art, the patient is examined with the pulse oximeter device in the sitting position. The oximeters do not operate when the patient's finger is moving. The reason for this is that, when the patient is moving the pulse oximeter device does not provide a correct result. However the device is required during an exercise and during various tests in order to monitor the patient. Currently used devices that displays the oxygen saturation with a pulse oximeter, may provide a wrong saturation level when the saturation seems to have fallen below a certain level, and as a result the patient may have dyspnoea. At the same time, there are tests that are used when determining the exercise capacity of an individual. For example, patients that are suffering from respiratory diseases such as COPD are subjected to a 6 minute walking test, where the patient has to be constantly moving. Due to this reason a pulse oximeter cannot be used during this test.

This invention can be used when the patient is moving. During exercise and the CPET tests, the oxygen saturation of the patient can also be continuously tracked. The patient is intervened before experiencing dyspnoea due to excessive usage of oxygen consumption during exercise. As a result, this situation does not harm the patient. The aim of this invention is to ensure that the pulse oximeter provides correct information to the user during exercise. The advantage of this invention is that it also provides saturation value.

The structural and characteristic features and all of the advantages of the invention will be more clearly understood through the figures below and the detailed description written with reference to these figures; and for this reason, the evaluation should be made by taking these figures and detailed description into consideration.

FIGURES DESCRIBING THE INVENTION

FIG. 1: Top view of the pulse oximeter that is not affected from motion

Figure 2:
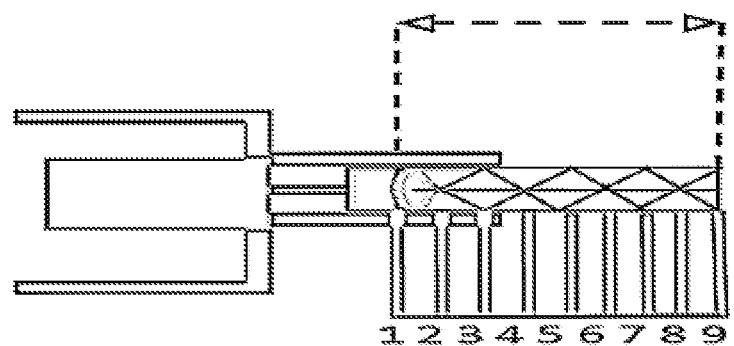

FIG. 2: Front view of the pulse oximeter that is not affected from motion

Figure 3:
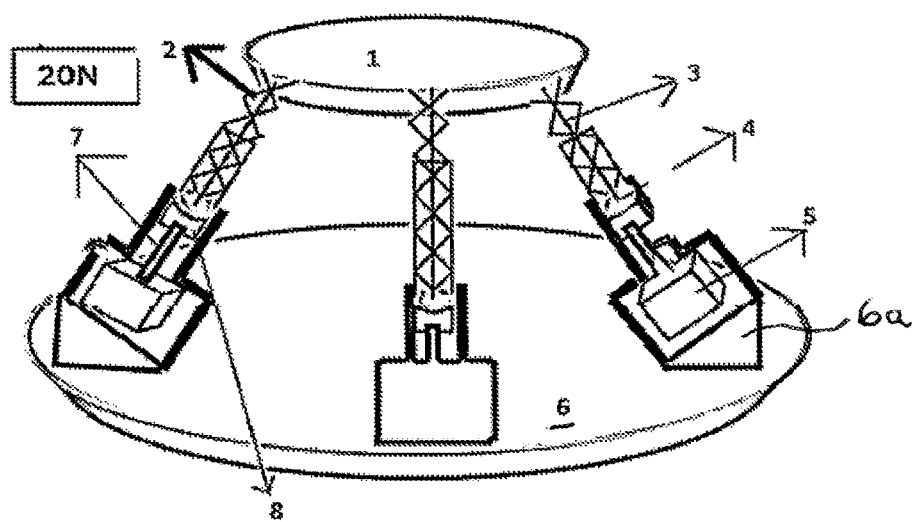
Figure 4:
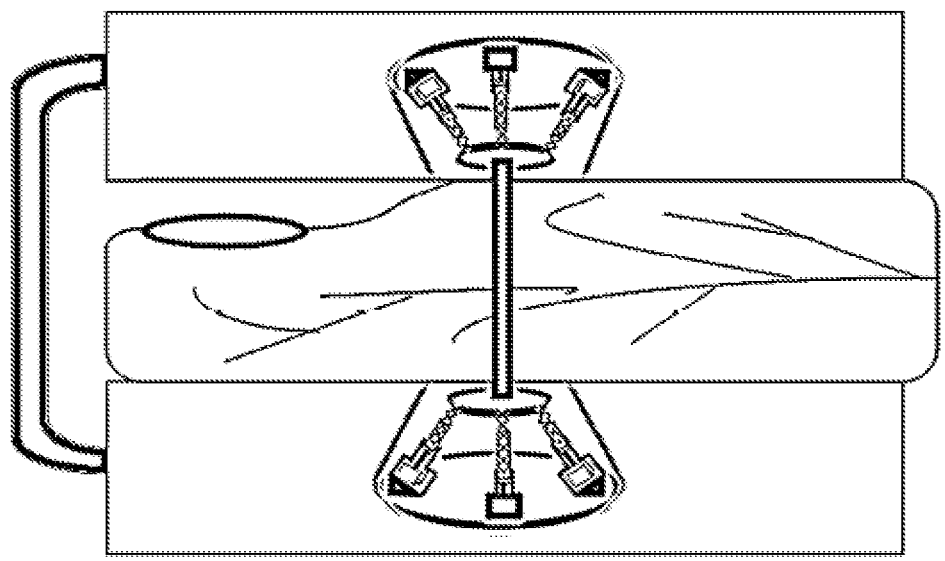

FIG. 3: Top perspective view of the pulse oximeter that is not affected from motion FIG. 4: General view of the pulse oximeter that is not affected from motion, which is clipped onto the finger

REFERENCE NUMBERS FOR DESCRIBING THE INVENTION

1. Small disk
2. Sensitive spring
3. String
4. Sensor
5. Motor
6. Large disk
7. Rod
8. String holder

DETAILED DESCRIPTION OF THE INVENTION

The invention comprises a small disk (1), a precision spring (2) that enables to objectively measure the force amount by moving downward during oscillation, a string (3) that prevents oscillation according to the tensioning force of the spring, or in other words according to the oscillation measures by the motor after motion has been sensed, an oxygen saturation sensor (4) that houses the precision spring and measures the tensioning force of the spring and delivers it to the opposite motor, a motor (5) that prevents oscillation by winding the opposite string (3) at the tensioning value measured at the force amount that is measured and delivered by the opposite sensor (4), a large disk (6) onto which a platform (6a) is fixed, a rod (7) that provides connection between the motor (5) and the section pulling the string (3) and a string holder (8) section that holds the string (3).

According to the invention the small disk (1) at the top moves down in order to balance the momentum during motion and thereby it constricts the spring. As a result a force is created at the precision spring (2). The main aim of the spring is to measure the force. This force is delivered to the motor (5) at the opposite side and the motor pulls the string (3) at the same ratio in order to balance the force delivered there to, or in other words to prevent oscillation and as a result, oscillation is prevented. By means of establishing a balance, the sensor (4) on the small disk (1) located on top, does not move and it enables the result to be correctly measured.

As it can be seen in FIG. 3, a 20 N force is released downwards with the string (3) and the precision spring (2). The sensor (4) located below the spring detects the force. As a result, the force is delivered to the motor (5) located at the opposite side. The opposite motor (5) pulls the string (3) with a 20 N force and prevents oscillation.

As a result of the invention, when a person is working at home, the rehabilitation can be applied and the saturation of the patient can be continuously monitored. The invention can operate under oscillating conditions. Additionally when the patient is walking, measurements can be continued to be taken.

The technical and other features mentioned in each claim are followed by a reference number, and these reference numbers have been used in order to make it easier to understand the claims; therefore it should be noted that none of the elements mentioned together with these reference numbers that have been given for illustration should be deemed to limit the scope of the invention.

It is obvious that a person skilled in the art can convey the novelty of the invention using similar embodiments and/or that such embodiments can be applied to other fields similar to those used in the related art. Therefore it is also obvious that these kinds of embodiments are void of the novelty criteria and the criteria of exceeding the known state of the art.

The invention claimed is:

1. A pulse oximeter that mitigates the effects of motion, the pulse oximeter comprising:
    a first disk;
    a spring connected to said first disk so as to oscillate relative thereto;
    a string connected to said first disk and extending along said spring, said string adapted to dampen the oscillation of said spring;
    a sensor positioned below said spring, said measure both oxygen saturation and a tensioning force of said spring;
    a motor tensioning force of said spring from the sensor, said motor wound to said string and adapted to wind the string so as to set the tensioning force of said spring to a tensioning value;
    a second disk having a platform thereon, the platform supporting said motor thereon;
    a rod connecting said motor to said string; and
    a string holder section receiving said string therein.

2. The pulse oximeter of claim 1, wherein said first disk has a diameter smaller than said second disk, said first disk being movable upwardly-and-downwardly relative to the oscillation of said spring.

* * * * *